United States Patent [19]

Murayama et al.

[11] 3,862,210

[45] Jan. 21, 1975

[54] NOVEL DERIVATIVES OF BETA-PHENOXYETHANOLS

[75] Inventors: Masao Murayama; Eisuke Seto; Hiroshi Enomoto; Takashi Okubo; Yoshitsugu Nomiyana; Katsuhide Saito, all of Kyoto, Japan

[73] Assignee: Nippon Shinyaku Co., Ltd., Kyoto, Japan

[22] Filed: June 11, 1973

[21] Appl. No.: 368,476

[30] Foreign Application Priority Data
July 5, 1972 Japan................................ 47-67842

[52] U.S. Cl................ 260/471 C, 260/472, 424/300
[51] Int. Cl............................................ C07c 125/06
[58] Field of Search......................... 260/471 C, 472

[56] References Cited
OTHER PUBLICATIONS

Finar, I. L. Organic Chemistry (Vol. I), 1963, Pub. by R. Clay & Co. of Great Britian, (Qb 251 F56) pp. 202, 383 & 653.

*Primary Examiner*—Lorraine A. Weinberger
*Assistant Examiner*—L. A. Thaxton

[57] ABSTRACT

A series of novel derivatives of β-phenoxyethanols, useful as remedies for arteriosclerosis, were prepared by the reaction of the corresponding β-phenoxyethanols with the corresponding phenyl isocyanates or, in some instances, by a reduction of the corresponding aldehydes using sodium borohydride or by acetylation of the corresponding alcohols using acetic anhydride.

7 Claims, No Drawings

NOVEL DERIVATIVES OF BETA-PHENOXYETHANOLS

The present invention relates to novel derivatives of β-phenoxyethanols having general formula [I]. Said novel derivatives according to the present invention are useful as remedies for human diseases, particularly for arteriosclerosis.

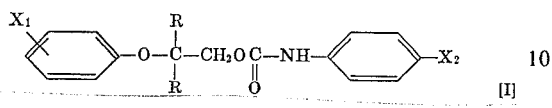

wherein
R represents H or $CH_3$,
$X_1$ represents H, Cl, $CH_3$, t-Bu, $OCH_3$, $-CF_3$, $-CHO$, $-CH_2OH$, $-CH_2OCOCH_3$, $$-CH_2N-CH_2CH\begin{matrix}CH_3\\CH_3\end{matrix}$$
$$\phantom{-CH_2N-}CH_3$$

and
$X_2$ represents H, Cl or Br.

The compounds [I] may be prepared by various methods known per se. Three of the most representative methods are given as hereunder under items A, B and C.

A. Compounds of general formula [I] wherein $X_1$ represents H, Cl, $CH_3$, t-Bu, $OCH_3$, $CF_3$, CHO or $$-CH_2NCH_2CH\begin{matrix}CH_3\\CH_3\end{matrix}$$
$$\phantom{-CH_2N}CH_3$$

are prepared by reacting β-phenoxyethanols of general formula [II]:

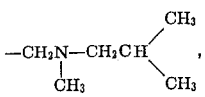

with phenylisocyanates of general formula [III]:

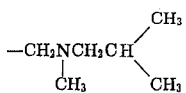

in the absence of solvent or in an inert solvent such as benzene in the presence or absence of a base such as pyridine at a temperature ranging from room temperature to reflux temperature of the solvent.

B. Compounds of general formula [I] wherein $X_1$ represents $CH_2OH$ are prepared by reacting compounds of general formula [IV]:

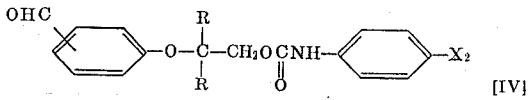

obtained in (A) with sodium borohydride in a polar solvent such as methanol.

C. Compounds of general formula [I] wherein $X_1$ represents $-CH_2OCOCH_3$ are prepared by reacting compounds of general formula [V]:

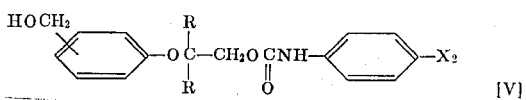

obtained in (B) with acetic anhydride preferably in the presence of pyridine.

The compounds obtained by the process of the present invention are useful for curing arteriosclerosis. Effects of the compounds were confirmed by the following pharmacological test.

a. Serum cholesterol-reducing effect:

Triton WR-1339 (300 mg/kg) was injected into tail vein of male rats of Wister strain (weight 180–220g; each group comprises 5–10 rats). Blood was taken after 18 hours and total serum cholesterol was measured by colorimetry according to modified Zak-Heuly method.

The sample was suspended in 0.2% agar-containing isotonic sodium chloride solution and injected in an amount of 100 mg/kg in the abdomen simultaneously to Triton.

b. Effect of inhibiting release of free fatty acids from fatty cells:

Fatty cells of rats prepared by Rodwell process were incubated in KRB (Klebs hicarbonate buffer) containing $10^{-4}$ M sample, $4 \times 10^{-6}$M norepinephrine and 3% albumin for 30 minutes and thus released free fatty adds were measured by colorimetry according to a process of Itaya, Ui.

| Compound number | R | $X_1$ | $X_2$ | Melting point (°C.) | Recrystallization solvent | Yield (percent) |
|---|---|---|---|---|---|---|
| 1 | $CH_3$ | 4-Cl | H | 96–98 | Dilute EtOH | 79 |
| 2 | $CH_3$ | 4-Cl | Cl | 74–76 | Benzene plus n-hexane | 80 |
| 3 | $CH_3$ | 4-Cl | Br | 84–85 | n-Hexane | 85 |
| 4 | H | 2-Cl | H | 106–107 | Benzene plus n-hexane | 90 |
| 5 | H | H | Cl | 108–109 | Benzene | 86 |
| 6 | H | 4-Cl | Cl | 126–127 | EtOH | 95 |
| 7 | H | 2-Cl | Cl | 122–123 | Benzene plus n-hexane | 91 |
| 8 | H | H | Br | 112–113 | Benzene | 95 |
| 9 | H | 2-Cl | Br | 130–131 | Benzene plus n-hexane | 93 |
| 10 | H | 4-Cl | Br | 136 | EtOH | 97 |
| 11 | H | 2-$CH_3$ | Cl | 115–117 | Benzene | 88 |
| 12 | H | 3-$CH_3$ | Cl | 114–116 | do | 91 |
| 13 | H | 4-$CH_3$ | Cl | 122–123 | do | 89 |
| 14 | H | 2-$OCH_3$ | Cl | 128–129 | MeOH | 75 |
| 15 | H | 2-$CH_2OH$ | Cl | 119–120 | Dilute EtOH | 87 |
| 16 | H | 4-$CH_2OH$ | Cl | 160–161 | Dilute MeOH | 85 |
| 17 | H | 3-$CF_3$ | Cl | 105–106 | Benzene plus n-hexane | 80 |
| 18 | H | 2-CHO | Cl | 132–133 | Benzene | 91 |
| 19 | H | 4-CHO | Cl | 158–160 | EtOH plus $CHCl_3$ | 97 |
| 20 | H | 2,4-di t-Bu | Cl | 163–164 | EtOH plus acetone | 85 |
| 21 | H | 4-$CH_2OCOCH_3$ | Cl | 116–118 | EtOH | 95 |
| 22 | H | 4-$CH_2N-CH(CH_3)_2$ ($CH_3$) | Cl | 76–78 | Benzene plus n-hexane | 88 |
| 23 | H | H | H | 97–98 | do | 95 |
| 24 | H | 4-Cl | H | 116–118 | EtOH | 97 |

| Com- pound No. | Elementary analysis | | | | | | Chol. % 100 mg/ Kg i.p. | FFA % $10^{-4}$M |
|---|---|---|---|---|---|---|---|---|
| | Theoretical | | | Found | | | | |
| | C | H | N | C | H | N | | |
| 1 | 63.85 | 5.67 | 4.38 | 64.07 | 5.83 | 4.87 | 8 | 41 |
| 2 | 57.64 | 4.84 | 3.95 | 57.69 | 4.79 | 3.85 | 32 | 43 |
| 3 | 51.21 | 4.30 | 3.51 | 51.31 | 4.32 | 3.41 | 18 | 32 |
| 4 | 61.75 | 4.84 | 4.80 | 62.00 | 4.93 | 4.82 | 47 | 33 |
| 5 | 61.75 | 4.84 | 4.80 | 61.83 | 4.86 | 4.96 | 23 | 51 |
| 6 | 55.23 | 4.02 | 4.29 | 55.12 | 3.95 | 4.36 | 26 | 39 |
| 7 | 55.23 | 4.02 | 4.29 | 55.44 | 4.07 | 4.45 | 18 | 32 |
| 8 | 53.59 | 4.20 | 4.17 | 53.85 | 4.27 | 4.05 | 15 | 32 |
| 9 | 48.61 | 3.54 | 3.78 | 48.64 | 3.42 | 3.88 | 29 | 30 |
| 10 | 48.61 | 3.54 | 3.78 | 48.55 | 3.41 | 3.82 | 25 | 24 |
| 11 | 62.85 | 5.27 | 4.58 | 62.65 | 5.12 | 4.30 | 32 | 51 |
| 12 | 62.85 | 5.27 | 4.58 | 63.21 | 5.10 | 4.49 | 29 | 68 |
| 13 | 62.85 | 5.27 | 4.58 | 63.16 | 5.40 | 4.48 | 22 | 74 |
| 14 | 59.72 | 5.01 | 4.35 | 59.61 | 4.86 | 4.35 | 4 | 20 |
| 15 | 59.72 | 5.01 | 4.35 | 59.71 | 4.81 | 4.44 | | |
| 16 | 59.72 | 5.01 | 4.35 | 59.14 | 5.10 | 4.27 | 43 | 84 |
| 17 | 53.42 | 3.64 | 3.89 | 53.69 | 3.83 | 3.52 | 15 | |
| 18 | 60.10 | 4.41 | 4.38 | 60.19 | 4.49 | 4.52 | | |
| 19 | 60.10 | 4.41 | 4.38 | 60.32 | 4.59 | 4.37 | 30 | 57 |
| 20 | 68.38 | 7.49 | 3.48 | 68.48 | 7.58 | 3.49 | 26 | |
| 21 | 59.43 | 4.99 | 3.85 | 59.58 | 5.06 | 3.65 | 20 | 62 |
| 22 | 64.52 | 6.96 | 7.17 | 64.12 | 6.98 | 6.97 | 17 | 4 |
| 23 | 70.02 | 5.88 | 5.44 | 70.00 | 5.79 | 5.43 | | |
| 24 | 61.75 | 4.84 | 4.80 | 61.58 | 4.89 | 4.81 | 23 | 51 |

The process of the present invention will be illustrated by way of examples. In the following examples, Examples 1 to 3 relate to the method A, example 4 relates to method B, and example 5 relates to method C as referred to before.

EXAMPLE 1

Synthesis of compound 3 (R=CH$_3$, X=Cl, X$_2$=Br) (Reaction in the absence of solvent):

4 Grams of β-methyl-β-(p-chlorophenoxy) propyl alcohol and 3.6 g of p-bromophenyl isocyanate were mixed together. When the mixture was then treated with one drop of pyridine, the reaction proceeded rapidly and the reaction mixture was solidified immediately. The solid was washed with n-hexane and filtered to afford 6.8 g of crude β-methyl-β-(p-chlorophenoxy)propyl-p-bromophenyl carbamate. After recrystallization of the crude product from n-hexane, the pure compound of m.p. 84°–85° C was obtained.

EXAMPLE 2

Synthesis of compound 2 (R=CH$_3$, X$_1$=Cl, X$_2$=Cl):

4 Grams of β-methyl-β-(p-chlorophenoxy)propyl alcohol and 3g of p-chlorophenyl isocyanate were dissolved in 15 ml of benzene and treated with two drops of pyridine. After heating on a water bath for 30 minutes, the solution was allowed to cool, concentrated under reduced pressure and treated with 30 ml of n-hexane. The resulting crystals were separated by filtration to afford 5.6 g of β-methyl-β-(p-chlorophenoxy)propyl-p-chlorophenyl carbamate. By recrystallization from benzene/n-hexane mixed solvent, the pure product of m.p. 74°–76° was obtained.

EXAMPLE 3

Synthesis of compound 19 (R=H, X$_1$=4—CHO, X$_2$=Cl):

10 Grams of β-(p-formylphenoxy)ethyl alcohol and 9.2 g of p-chlorophenyl isocyanate were dissolved in 40 ml of benzene. After heating on a water bath for 3 hours and allowing the cool, the resulting precipitate was separated by filtration to obtain 18.8 g of crude β-(p-formylphenoxy)ethyl-p-chlorophenyl carbamate in crystalline form. By recrystallization of the crude product from ethanol/chloroform mixed solvent, the pure product of m.p. 158°–160° was obtained.

EXAMPLE 4

Synthesis of compound 16 (R=H, X$_1$=4—CH$_2$OH, X$_2$=Cl):

14.9 Grams of β-(p-formylphenoxy)ethyl-p-chlorophenyl carbamate were suspended in 60 ml of methanol. 1.4 Grams of sodium borohydride was added slowly to the suspension under stirring to effect exothermic reaction whereby homogeneous solution was obtained. Then, crystal began to precipitate. After 2 hours, the precipitated crystals were separated by filtration to obtain 12.8 g of β-(p-hydroxymethylphenoxy)ethyl-p-chlorophenyl carbamate of m.p. 160°–161°. If necessary, the product was recrystallized from dilute methanol.

EXAMPLE 5

Synthesis of compound 21 (R=H, X$_1$=4—CH$_2$OCOCH$_3$, X$_2$=Cl):

4.5 Grams of β-(p-hydroxymethylphenoxy)ethyl-p-chlorophenyl carbamate were dissolved in 30 ml of acetone and 10 ml of acetic anhydride and then the solution was treated with 9 ml of pyridine under stirring. After 6 hours, the reaction liquid was concentrated under reduced pressure and treated with n-hexane. Thus precipitated crystals were separated by filtration and recrystallized from EtOH to afford 4.8 g of β-(p-acetoxymethylphenoxy)-ethyl-p-chlorophenyl carbamate of m.p. 116°–118°.

What is claimed is:

1. A β-phenoxyethanol compound of the formula:

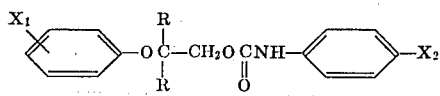

wherein
R is H or CH$_3$,
X$_1$ is H, Cl, CH$_3$, t-butyl, OCH$_3$, CF$_3$, CHO, CH$_2$OH, CH$_2$OCOCH$_3$ or

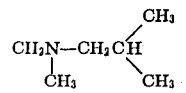

and

X₂ is H, Cl or Br.

2. The compound of claim 1 which is β-methyl-β-(p-chlorophenoxy)propyl-p-bromophenyl carbamate.

3. The compound of claim 1 which is β-methyl-β-(p-chlorophenoxy)propyl-p-chlorophenyl carbamate.

4. The compound of claim 1 which is β-(p-formylphenoxy)ethyl-p-chlorophenyl carbamate.

5. The compound of claim 1 which is β-(p-hydroxymethylphenoxy)ethyl-p-chlorophenyl carbamate.

6. The compound of claim 1 which is β-(p-acetoxymethylphenoxy)-ethyl-p-chlorophenyl carbamate.

7. The compound of the formula 1 wherein the $X_1$ substituent is other than hydrogen and is in the 2- or 4- position with respect to the oxygen atom of the phenoxy moiety.

* * * * *